Patented Sept. 16, 1952

2,610,905

UNITED STATES PATENT OFFICE 2,610,905

ACCELERATED SETTLING OF BLEACH IMPURITIES

Jerrold O. Hinshaw, Downey, Calif., assignor to Purex Corporation, Ltd., South Gate, Calif., a corporation of California No Drawing. Application June 9, 1950, Serial No. 167,263

4 Claims. (Cl. 23—86)

This invention relates generally to the making of sodium hypochlorite bleach solutions by chlorination of alkali metal hydroxide solutions, and is directed particularly to improvements resulting in greatly accelerated settling of impurities out of the bleach batch.

As is generally known, final purification of such hypochlorite bleach solutions requires that following chlorination, the batch be permitted to stand over a period sufficient to settle out impurities such as metals or metallic oxides originating as impurities in the caustic soda, or taken into solution from vessels or the chlorinating equipment.

To cite a typical example of a general common procedure, 2500 pounds of caustic soda dissolved in 4200 gallons of water precooled to 50° F., was chlorinated (using e. g., liquid chlorine) at a rate sufficient to maintain thorough agitation and mixing of the solution. The chlorination was continued until the free (unreacted) sodium hydroxide content of the bleach was reduced to approximately one-half per cent by weight of the starting caustic soda, on a solid basis, as is desirable for stabilization of the finished bleach. The pH of the resulting 5¼% sodium hypochlorite solution ranged between 12–12.5 and the oxidation potential between 550 to 600 millivolts. Satisfactory separation of impurities necessitated a settling out time of around twelve hours, prior to decanting the bleach from the sediment.

The present invention has for its general object to greatly accelerate the separation of impurities out of the finished bleach, to a degree such that the settling out time may be reduced by as much as fifty per cent. As will appear, such acceleration may result alone from the later described control of the free caustic soda content of a conventional bleach batch, and without any extraneous settling agent or additive, or from the combined settling tendencies of both such additive and the caustic soda control.

Briefly, the invention is predicated upon the discovery that if the chlorination of a caustic soda solution of appropriate concentration for bleach manufacture, is carried to the point where no appreciable amount of free sodium hydroxide remains in the solution, and caustic soda is then added to furnish the concentration thereof desired in the finished product, the effect is to cause an accelerated settling out of impurities to the extent that whereas a batch chlorinated in the customary manner (i. e., down to but not exceeding the desired residual free caustic soda content) may require around twelve hours settling time, by the present methods that time may be reduced to as low as six hours. Completeness of settling may be benefited by the addition of a settling agent, particularly magnesium chloride.

In carrying out the preparation and control of a quick settling bleach batch, a suitable caustic soda solution may be prepared, as in the example above, typically by dissolving 2500 lbs. in 4200 gallons of water precooled to 50° F. If a settling agent is used, magnesium chloride monohydrate may be added in a suitable amount between, e. g. 0.008 to 0.026% by weight of the solution. Chlorination, as by the addition of liquid chlorine to the solution, is continued until the solution is found to contain 0% free sodium hydroxide. During chlorination, the free sodium hydroxide content of the batch may be determined directly and at adequately frequent intervals for control purposes, by adding a 10% solution of barium chloride in 3% hydrogen peroxide to a sample of the bleach. The peroxide decomposes the hypochlorite and the barium chloride precipitates the interfering carbonate. If no sodium hydroxide is present, this mixture is colorless to phenolphthalein indicator. If a red color develops the sodium hydroxide content may quantitatively be determined by titrating with standard acid to a colorless end point.

When the batch shows 0% free sodium hydroxide, sufficient sodium hydroxide (e. g. in a 28% solution) is then added to bring the alkalinity to within about 0.1% to 1.0%, and preferably about 0.5%, free sodium hydroxide. Thereafter the batch will settle clear within six to eight hours, in contrast with batches prepared and settled by the conventional procedures, which require around 12 hours to settle clear. It is noticed that the quick settled batches prepared in accordance with the invention, appear brighter in the bleach tanks than the conventional batches which require settling over considerably prolonged time. It is further found that despite the quick settling of impurities, the product hypochlorite solution retains the desired properties of color and stability.

I claim:

1. The method that includes introducing chlorine into an aqueous sodium hydroxide solution containing impurities to produce a sodium hypochlorite solution, continuing the chlorination until no appreciable free sodium hydroxide remains in the solution, then adding sodium hydroxide to the solution, then allowing said impurities to settle out of the solution in the presence of magnesium chloride added to the solution and at a rate accelerated by the combined effects of the added magnesium chloride and the aforesaid chlorination of the solution and addition thereto of sodium hydroxide, and finally separating the solution from the settled impurities.

2. The method as defined in claim 1, in which the amount of added magnesium chloride is between about 0.008 to 0.026% of the weight of the solution.

3. The method as defined in claim 1, in which the amount of sodium hydroxide added to the solution is between about 0.10% to 1.0% by weight of the total solution.

4. The method as defined in claim 1, in which the amount of magnesium chloride added to the solution is between about 0.008 to 0.026% by weight thereof, and the amount of added sodium hydroxide is between about 0.10% to 1.0% by weight of the solution.

JERROLD O. HINSHAW.

REFERENCES CITED

The following references are of record in the file of this patent:

UNITED STATES PATENTS

| Number | Name | Date |
|---|---|---|
| 1,023,287 | Wilsing | Apr. 16, 1912 |
| 1,850,975 | Baker | Mar. 22, 1932 |
| 1,883,649 | Engberg | Oct. 18, 1932 |
| 2,403,789 | Cummins | July 9, 1946 |
| 2,562,169 | Brumbaugh | July 31, 1951 |
| 2,575,238 | Stenger | Nov. 13, 1951 |

OTHER REFERENCES

"Catalog of Baker Analyzed Chemicals," page 116, Jan. 1, 1935 ed. J. T. Baker Chemical Co., New York.